Aug. 7, 1923.
H. L. LEAS
VALVE
Filed Dec. 23, 1921
1,464,007
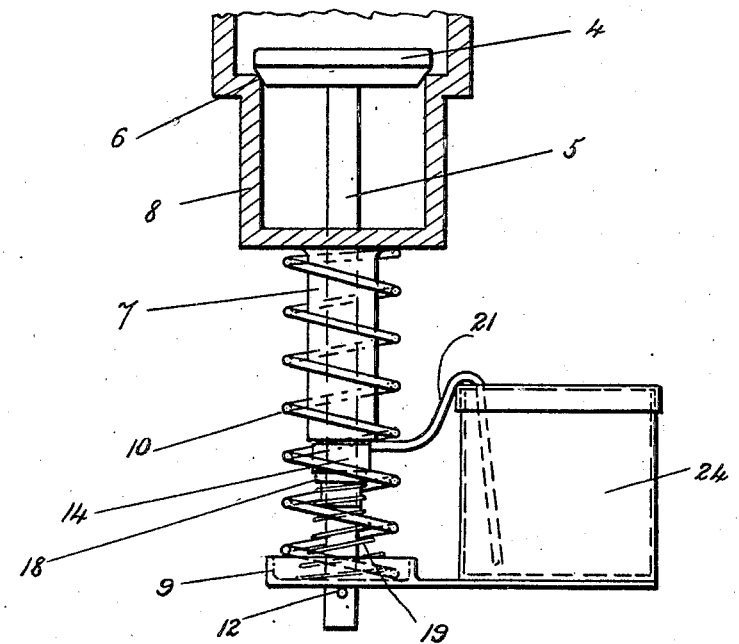
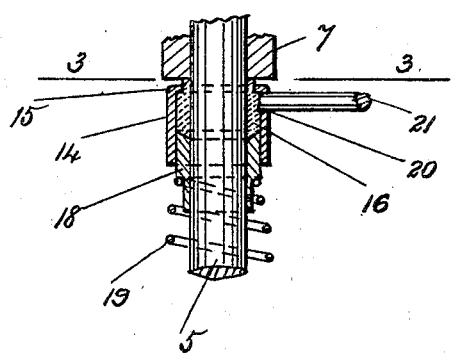
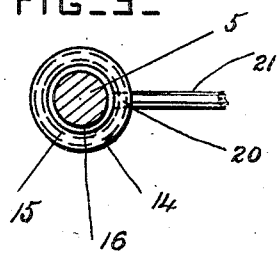
Inventor
Harold L. Leas
by Herbert W. P. Jenner
Attorney Patented Aug. 7, 1923.

1,464,007

UNITED STATES PATENT OFFICE.

HAROLD LESLIE LEAS, OF WAUKON, IOWA.

VALVE.

Application filed December 23, 1921. Serial No. 524,390.

*To all whom it may concern:*

Be it known that I, HAROLD L. LEAS, a citizen of the United States, residing at Waukon, in the county of Allamakee and State of Iowa, have invented certain new and useful Improvements in Valves, of which the following is a specification.

This invention relates to valves specially adapted for use in connection with internal combustion engines, but which may be used in other relations, and particularly where subjected to heat and where it is desirable to prevent gas from leaking out around the valve stem. This invention consists in providing the valve stem with a packing device and in keeping the packing in the said device constantly lubricated, as hereinafter fully described and claimed.

In the drawings, Figure 1 is a front view of a valve constructed according to this invention, showing the valve seat and guide in section. Fig. 2 is a vertical section through the packing device, drawn to a larger scale. Fig. 3 is a cross-section through the valve stem, taken on the line 3—3 in Fig. 2.

The valve 4 is of the disk type, and 5 is its stem which is slidable in a guide 7 on the valve casing seat which is provided with a seat 6 for the valve.

A helical spring 10 is provided for closing the valve, and is arranged between the valve casing 8 and an abutment plate 9 which is retained on the lower end portion of the valve stem by a pin 12. The spring 10 encircles the tubular guide 7 in which the valve stem is slidable. A cylindrical packing box 14 is provided and is arranged on the valve stem below the guide, and it has a flange 15 at its upper end which projects inwardly but does not touch the valve stem. This packing box is filled with packing 16 of soft material, asbestos felt being preferred for that purpose. The felt fills the packing box and projects at its upper side through the opening between the edge of the flange and the valve stem. A gland 18 is provided, and is slidable in the lower part of the packing box.

A helical spring 19 is arranged between the gland 18 and the abutment plate 9, and this spring is preferably conical, thus being larger at its lower end where it rests on the abutment plate, so that it may take up less room when compressed. This spring 19 is lighter than the valve closing spring 10, and it is arranged inside the coils of the closing spring. A hole 20 is provided in one side of the packing box, and 21 is a lamp wick which is connected to the felt in the packing box, and which passes out through the hole 20.

The free end portion of the lamp wick extends into a receptacle 24 for oil or other lubricant, and this receptacle is preferably formed on or secured to the abutment plate 9. The absorbent material of the wick 21 keeps the felt packing charged with oil from the oil receptacle, and the spring 19 presses the packing box against the end of the guide 7 around the valve stem. This packing is self adjusting, and it prevents gas from leaking out around the valve stem, and it ensures the valve stem being well lubricated.

What I claim is:

1. The combination, with a valve casing provided with a tubular guide, a valve having a stem which is slidable in the said guide, and a receptacle for lubricant supported by the said valve stem; of a packing device encircling the valve stem and provided with packing, an absorbent wick which delivers lubricant automatically from the said receptacle to the packing, and a spring which presses the packing device against the end of the guide around the valve stem.

2. The combination, with a valve casing provided with a tubular guide, and a valve having a stem which is slidable in the said guide; of an abutment plate carried by the valve stem, a helical spring for closing the valve, which bears on the abutment plate, a packing device encircling the valve stem and provided with packing, a receptacle for lubricant carried by the abutment plate, an absorbent wick which delivers lubricant automatically from the said receptacle to the packing, and a spring which presses the packing device against the end of the guide around the valve stem and which is arranged inside the valve closing spring between the packing device and the abutment plate.

In testimony whereof I have affixed my signature.

HAROLD LESLIE LEAS.